United States Patent Office 3,702,208
Patented Nov. 7, 1972

3,702,208
MAGNETIC BEARINGS
Helmut Habermann, 2 Allee Principale; Loyen Roger, 27 Allee Circulaire; and Pierre Joly, 18 Allee Circulaire, all of Vernon, France
Filed June 16, 1971, Ser. No. 153,710
Claims priority, application France, June 17, 1970, 7022292
Int. Cl. F16c 39/06
U.S. Cl. 308—10
5 Claims

ABSTRACT OF THE DISCLOSURE

A magnetic bearing such as for a satellite comprises two relatively rotatable members, one of which is at least partly constituted of a magnetic material while the other is provided with at least one pair of electromagnets. The electromagnets in each pair are arranged to act in opposition on the magnetic material and are connected to a respective pair of detecting devices for detecting the relative positions of the two members of the bearing, the detecting devices being connected in opposition and being arranged to control the electromagnets so that any relative displacement in one direction or the other between the two members of the bearing is nullified by the combined action of the electromagnets.

BRIEF SUMMARY OF THE INVENTION

The invention relates to magnetic bearings comprising two members rotatable relative to one another, one of the two members consisting, at least partly, of a magnetic material, while the other member is provided with at least one pair of electromagnets, the electromagnets in each pair acting in opposition on the magnetic material.

An object of the present invention is to provide such a magnetic bearing with relative stability to obtain a substantially predetermined relative radial or axial positioning of the two members in relative rotational movement.

According to the invention, there is provided a magnetic bearing comprising two members rotatable relative to one another, one of the two members consisting at least partly of a magnetic material while the other member is provided with at least one pair of electromagnets, the electromagnets in each pair being arranged to act in opposition on the magnetic material, there being for each pair of electromagnets a pair of detecting devices for detecting the relative positions of the two members of the bearing, the detecting devices in each pair being connected in opposition and being arranged to control the electromagnets so that any relative displacement in one direction or the other between the two members of the bearing is substantially cancelled out by the combined action of the electromagnets.

For a better understanding of the invention and to show how the same may be carried into effect, reference will now be made, by way of example, to the accompanying drawings.

DETAILED DESCRIPTION

Figure 1:
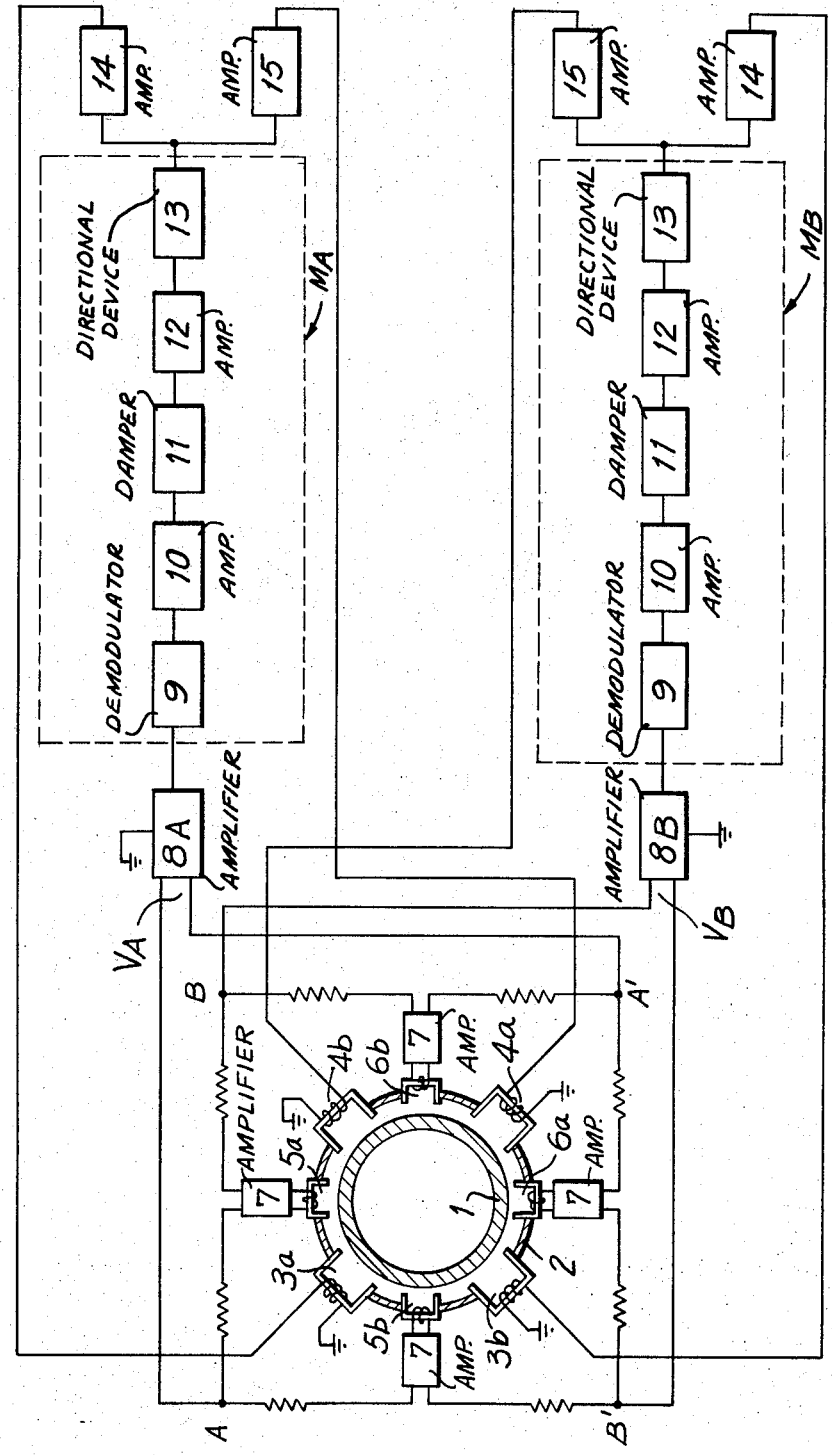
FIG. 1 is an electric circuit diagram illustrating a magnetic bearing according to the invention.

The magnetic bearing illustrated in FIG. 1 is a radial bearing comprising two concentric cylindrical members 1 and 2, which, in operation, will be in rotational movement relative to one another.

The member 1 consists at least partly of laminated magnetic material.

The member 2 is provided with two pairs of electromagnets 3a, 4a and 3b, 4b, the electromagnets in each pair acting in opposition on the member 1 and the pairs acting perpendicularly to one another.

Associated with each pair of electromagnets is a pair of detecting devices 5a, 6a and 5b, 6b for detecting the relative positions of the two members 1 and 2 of the bearing.

One of the pairs of detecting devices, 5a, and 6a, is associated with the pair of electromagnets 3a, 4a, while the other pair of detecting devices, 5b and 6b, is associated with the pair of electromagnets 3b, 4b.

The detecting devices in each pair are connected in opposition, advantageously in a bridge arrangement, so as to control the two pairs of electromagnets 3a, 4a and 3b, 4b in such manner that any relative displacement in one direction or the other between the two members 1 and 2 of the bearing is cancelled out by the combined action of the electromagnets 3a, 4a and 3b, 4b.

For this purpose, the detecting devices 5a, 6a and 5b, 6b are connected to a bridge AA'BB' through amplifiers 7.

These detecting devices may be of the electromagnetic type, in which case it is advantageous to offset them in relation to the electromagnets to avoid magnetic reaction which might be exerted on them by the electromagnets.

The voltage $V_A$ at the apices AA' of the bridge arrangement is proportional to the position of the member 1 in relation to the pair of detecting devices 5a, 6a. The voltage $V_B$ at the apices BB' of the bridge arrangement is proportional to the position of the member 1 in relation to the pair of detecting devices 5b, 6b.

The voltages $V_A$ and $V_B$ are amplified in two amplifiers $8_A$ and $8_B$ respectively.

The amplifiers $8_A$ and $8_B$ are connected to two identical measuring networks $M_A$ and $M_B$ comprising successively a demodulator 9, a selective amplifier 10 which has a greater sensitivity to low frequencies, a damping cell 11 acting by phase advance, a linearizing amplifier 12 and a directional device 13 comprising diodes.

Provided at the end of each network $M_A$ and $M_B$ are two power amplifiers 14 and 15. For the network $M_A$, the amplifiers 14 and 15 control the electromagnets 3a and 4a of the first pair, and for the network $M_B$, amplifiers 14 and 15 control the electromagnets 3b and 4b of the second pair.

What has just been described and explained with reference to a radial magnetic bearing could also be applied to an axial magnetic bearing in which the members in relative rotational movement have opposed surfaces perpendicular to the axis of rotation or in which the members in relative rotational movement have opposed surfaces at least partly of conical or spherical complementary form.

In any case, such a magnetic bearing generates very weak frictional couples and has application in many fields.

These fields include the space field and more particularly the maintenance, relative to one another, of the two rotating sections of a satellite stabilized by rotation, for example such as a geostationary or fixed-orbit telecommunications satellite.

Figure 2:
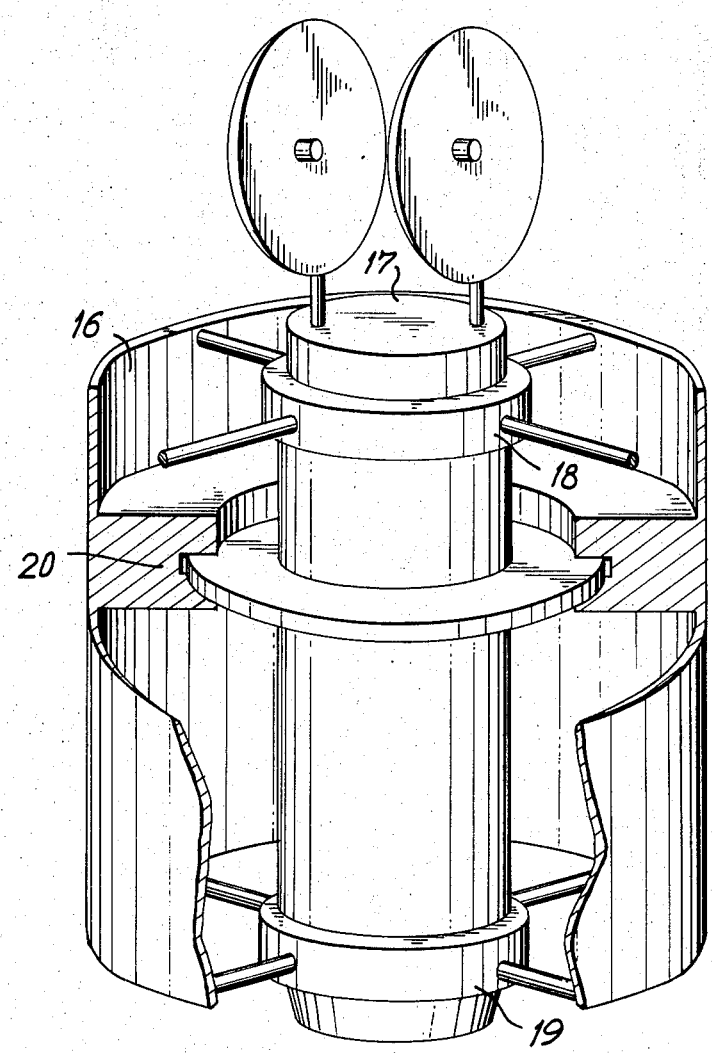
FIG. 2 is a perspective view partly broken away of the bearing illustrated in FIG. 1 in the form of a satellite stabilized by rotation.

FIG. 2 illustrates such a satellite having two sections 16 and 17 which rotate in relation to one another at speeds of the order of 10 to 100 revolutions per minute, there being two radial magnetic bearings 18 and 19 and an axial magnetic bearing 20, the bearings 18, 19 and 20 being constituted according to the invention.

What is claimed is:

1. A satellite for use in outer space comprising two relatively rotatable sections one of which is constituted at least partly of a magnetic material, and bearing means between said sections to stabilize the axial and rotational positions thereof, said bearing means including two radial magnetic bearings and an axial magnetic bearing between the sections, each magnetic bearing comprising two pairs of electromagnets operatively coupled with the other section, the electromagnets in each said pair being arranged to act in opposition on the magnetic material, the electromagnets of the two pairs acting on the magnetic material at right angles to one another, two corresponding pairs of detecting devices each associated with a respective pair of electromagnets and connected in a bridge arrangement for detecting the relative positions of said two sections, said detecting devices being connected in opposition in symmetrically offset relation relative to the electromagnets to control the respective electromagnets so that any relative displacement in one direction or the other between said two sections is substantially cancelled by the combined action of the electromagnets, two amplifiers connected to the bridge arrangement at respective diagonals thereof, two identical measuring networks connected to respective amplifiers, and power amplifiers connected at the respective outputs of said measuring networks and to respective electromagnets to control said electromagnets.

2. A satellite as claimed in claim 1 wherein each measuring network comprises a demodulator connected to the associated amplifier connected to its respective bridge diagonal, a damper connected to the demodulator and a directional device connected between the damper and the associated power amplifier.

3. A bearing according to claim 1 wherein said detecting devices are electromagnetic.

4. A bearing according claim 1 wherein said two members are cylindrical and concentric.

5. A bearing according to claim 1 wherein said two sections have opposed surfaces between which the electromagnets act perpendicular to their axes of displacement.

References Cited
UNITED STATES PATENTS

| | | | |
|---|---|---|---|
| 3,124,962 | 3/1964 | Hirtreiter | 308—10 |
| 3,565,495 | 2/1971 | Lyman | 308—10 |
| 3,473,852 | 10/1969 | Lyman | 308—10 |
| 2,856,238 | 10/1958 | Dacus | 308—10 |
| 3,458,239 | 7/1969 | Dorsman | 308—10 |
| 3,260,475 | 7/1966 | Ormsby | 308—10 |
| 3,358,945 | 12/1967 | Blount | 308—10 |

ROBERT SKUDY, Primary Examiner